United States Patent [19]

Takeya et al.

[11] B 4,012,459

[45] Mar. 15, 1977

[54] ACRYLIC FIBER OF IMPROVED PROPERTIES

[75] Inventors: Kenji Takeya; Hiroshi Suzuki; Noboru Yamawaki, all of Okayama, Japan

[73] Assignee: American Cyanamid Company, Stamford, Conn.

[22] Filed: Aug. 15, 1973

[21] Appl. No.: 388,675

[44] Published under the second Trial Voluntary Protest Program on March 30, 1976 as document No. B 388,675.

[52] U.S. Cl. .............................. 260/873; 264/182
[51] Int. Cl.² .................................... C08L 67/06
[58] Field of Search ............... 264/182, DIG. 29; 260/873

[56] References Cited

UNITED STATES PATENTS 3,773,884  11/1973  Shimosaka et al. ............ 264/182

FOREIGN PATENTS OR APPLICATIONS

| 40-1460 | 1/1965 | Japan | 264/DIG. 29 |
| 45-39493 | 12/1970 | Japan | 264/182 |
| 238,072 | 2/1969 | U.S.S.R. | 264/DIG. 29 |

Primary Examiner—Jay H. Woo
Attorney, Agent, or Firm—William J. van Loo

[57] ABSTRACT

There are disclosed a process for preparing acrylic fibers of improved hot-wet properties and improved elastic recovery by finely dispersing in the spin dope prior to spinning a solution of a polycarbonate resin in a solvent immiscible with the spin dope. The acrylic fibers so produced contain elongated fibrils of the polycarbonate resin of 0.05 to 5.0 microns diameter and up to several centimeters long.

9 Claims, No Drawings

ACRYLIC FIBER OF IMPROVED PROPERTIES

This invention relates to acrylic fiber having improved properties and to the process for providing the improved acrylic fiber. More particularly, this invention relates to an acrylic fiber having improved hot-wet properties and improved elastic recovery.

The acrylic fiber produced by conventional spinning processes has favorable dyeability, distinctive touch, and excellent bulkiness, making it eminently suitable for use in apparel and home furnishing uses. However, the conventional acrylic fiber is deficient in hot-wet properties and in elastic recovery. These deficiencies cause various problems in fiber processing and in service use of knit or woven fabrics made from such fiber. Specifically, such fibers, yarns, or knit and woven fabrics therefrom, are deformed in dyeing to such an extent that they do not survive subsequent processing or have poor commodity value and develop wrinkles that are difficult to remove.

In order to overcome such deficiencies it has previously been proposed to blend in with the fiber forming polymer a polymer such as poly($\alpha$-methylstyrene), cellulose acetate, or a polyurethane. However, such blending causes other deficiencies such as phase separation of polymers and fiber devitrification which severly reduce the commodity value of the final fiber.

In accordance with the process aspect of the present invention, there is provided a process for preparing an acrylic fiber of improved hot-wet properties and improved elastic recovery which comprises: (a) preparing a spinning solution of a fiber-forming polymer containing at least 40 weight percent of acrylonitrile and any balance of one or more monomers copolymerizable therewith, said solution containing from about 5 to 35 weight percent of said fiber-forming polymer; (b) separately preparing a solution of a polycarbonate of the general formula

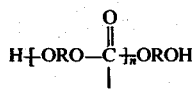

wherein R is the residue of an aliphatic or aromatic-aliphatic dihydroxy organic compound reacted to form a polycarbonate ester and n is an integer sufficient to provide a molecular weight of at least about 18,000 in a solvent therefor, said polycarbonate solution being incompatible with said spinning solution and containing from about 2 to 35 weight percent of polymer; (c) intimately dispersing said polycarbonate solution in said spinning solution so as to provide from about 1 to 50 weight percent of polycarbonate based on the total weight of fiber-forming polymer and polycarbonate; (d) spinning said dispersion into filaments; (e) washing the spun filaments; (f) stretching the washed filaments; (g) drying the stretched filaments; and (h) thereafter heat relaxing the dried fiber.

In accordance with the product aspect of the present invention, there is provided an acrylic fiber of improved hot-wet properties and improved elastic recovery which comprises a matrix of a fiber-forming acrylonitrile polymer containing at least 40 weight percent of acrylonitrile and any balance of one or more monomers copolymerizable therewith, said matrix forming from 50 to 99 weight percent of the total weight of fiber and discontinuously distributed within said matrix from about 1 to 50 weight percent based on the total weight of fiber of a polycarbonate of the formula

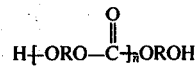

wherein R is the residue of an aliphatic or aromatic-aliphatic dihydroxy organic compound after esterification to form a polycarbonate and n is an integer sufficient to provide a molecular weight of at least about 18,000, said polycarbonate being present in the form of a plurality of fibrils of a diameter in the range of about 0.05 to 5 microns and a length to diameter ratio of at least 10.

In accordance with the present invention, when the fiber has the structure of fibrils of polycarbonate discontinuously dispersed in the acrylic fiber-forming matrix, the hot-wet properties and elastic recovery are greatly improved. In addition, the mutual attraction of the polycarbonate and the acrylic polymer are so great that fibrillation in processing or service use is prevented and devitrification is not evidenced. An added advantage of the fiber structure is an improvement in anti-soiling tendencies.

In carrying out the present invention, as the fiber-forming acrylic polymer, there may be employed a homopolymer of acrylonitrile or an acrylonitrile copolymer containing at least 40 weight percent of acrylonitrile, preferably, 80 weight percent, and any balance of one or more monomers copolymerizable with acrylonitrile. The copolymerizable monomers conventionally employed in preparing fiber-forming acrylonitrile copolymers are well known and include such monomers as acrylic and methacrylic acids; methyl and ethyl esters of acrylic and methacrylic acids; vinyl acetate and vinyl propionate; vinyl chloride, vinyl bromide and vinylidene chloride; vinylsulfonic acid, allylsulfonic acid, methallylsulfonic acid, p-styrenesulfonic acid and salts thereof; styrene; methacrylonitrile; and the like.

The acrylonitrile fiber-forming polymer is dissolved in a suitable solvent therefor to form a spinning solution. Generally, the polymer will form from about 5 to about 35 weight percent, based on the weight of the spinning solution. Suitable polymer solvents may be selected from organic solvents such as dimethyl formamide, dimethyl acetamide, dimethyl sulfoxide, ethylene carbonate, and $\gamma$-butyrolactone and from inorganic solvents such as concentrated aqueous solutions of sodium thiocyanate, calcium thiocyanate, zinc chloride, and nitric acid.

The useful polycarbonate resin is one that has the structure

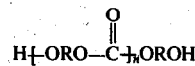

wherein R is a residue of an aliphatic or aromatic-aliphatic dihydroxy organic compound after esterification to form a polycarbonate and n is an integer sufficient to provide a molecular weight of at least about 18,000, preferably 25,000, and still more preferably about 100,000 or more. These polycarbonates are well known commercial products that are widely available. Various examples of suitable polycarbonates are described, for example, in *Encyclopedia of Polymer Sci-* ence and Technology, John Wiley and Sons, Inc., New York, N.Y., U.S.A., Volume 10, pages 710–764 (1969). A preferred species of polycarbonate is one derived from bisphenol A by interfacial polycondensation with phosgene in the presence of xylene and aqueous alkali. Typically, this procedure gives a polycarbonate of molecular weight of 120,000 in about 2 to 3 hours. Bisphenol A is the more common name for 2,2-(4,4'-dihydroxydiphenyl)propane.

In preparing a solution of the polycarbonate, useful solvents include chloroform, methylene chloride, dioxane, tetrachloroethane, pyridine, and tetrahydrofuran. The solvent employed should provide a solution which contains from about 2 to about 35 weight percent of polycarbonate based on the total weight of solution and is incompatible with the spinning solution.

The polycarbonate solution is then intimately dispersed in the spinning solution by use of a suitable dispersing means. Typically, a high speed propeller-blade agitator will provide the proper degree of dispersion.

The dispersion of polycarbonate solution in the spinning solution of acrylonitrile polymer is then formed into filaments by a suitable spinning procedure. Preferably, the spinning is effected by the conventional procedures using a suitable coagulant. The spun filaments are washed, stretched, dried, and relaxed in accordance with conventional processing to provide the fiber of improved properties.

It is, of course, possible to employ conventional fiber modifiers so long as they do not interfere with the use of polycarbonate as indicated. Such conventional modifiers include titanium dioxide delustrant, dyes, flame retardants, antistatic agents and the like.

The invention is more fully illustrated by the examples which follow wherein all parts and percentages are by weight unless otherwise specifically designated.

EXAMPLE 1

A fiber-forming spinning solution was prepared by dissolving 11 parts of a copolymer of 90 percent acrylonitrile and 10 percent methyl acrylate in 89 parts of an aqueous solution of 60 percent sodium thiocyanate. A solution of a polycarbonate obtained by interfacial polymerization of bisphenol A with phosgene having a number average molecular weight of 120,000 was prepared by dissolving 18 parts of the polycarbonate in 82 parts of tetrachloroethane. The polycarbonate solution was dispersed in the spinning solution using a propeller type agitator. The polycarbonate solution was added in sufficient amount to provide a ratio of 85:15 of acrylic polymer to polycarbonate and mixing was continued until a uniform dispersion was obtained. The resulting composition was de-aerated and spun into an aqueous solution of sodium thiocyanate maintained at −3°C. using a spinnerette having 50 orifices each of a diameter of 0.1 millimeter. The coagulated filaments were subjected to stretching at a stretch ratio of 2 in conjunction with cold water washing and then subjected to stretching at a stretch ratio of 5 in boiling water. After drying to collapse the wet gel structure, the fiber was heat relaxed at 125°C. to obtain an acrylic fiber free from devitrification and fibrillation. The fiber, upon microscopic examination, was found to contain numerous fibrils of polycarbonate discontinuously distributed therethrough, the fibrils having diameters ranging from 0.5 to 2 microns and a length to diameter ratio of 10 and greater. The following properties relative to fiber spun from the same acrylic polymer without the polycarbonate additive were obtained.

|  | With Polycarbonate | Without Polycarbonate |
| --- | --- | --- |
| Young's Modulus (grams/denier) in Water at 95°C. | 2.37 | 0.88 |
| 3% Elongation Elasticity in Water at 95°C. (%) | 80.4 | 78.6 |

EXAMPLE 2

A fiber-forming spinning solution was prepared by dissolving 12 parts of a copolymer of 90 percent acrylonitrile and 10 percent methyl acrylate in 88 parts of concentrated nitric acid. The same polycarbonate solution used in Example 1 was again employed. The polycarbonate solution was dispersed in the spinning solution so as to provide a ratio of acrylic polymer to polycarbonate of 90:10 using the equipment of Example 1. When a uniform dispersion was obtained, the composition was de-aerated and then spun into an aqueous solution of 30–35 percent nitric acid using a spinnerette having 50 orifices each of 0.1 millimeter diameter. The coagulated filaments were washed, stretched, dried and heat-relaxed according to conventional procedures. The fiber obtained upon microscopic examination revealed a similar fibril-matrix structure as in Example 1 and similar properties to the fiber of Example 1.

EXAMPLE 3

A fiber-forming spinning solution was prepared by dissolving 11 parts of a copolymer of 88 percent acrylonitrile and 12 percent vinyl acetate in 89 parts of an aqueous solution of 44 percent sodium thiocyanate. The polycarbonate solution of Example 1 was again employed. Use of polycarbonate and fiber spinning was as in Example 1 except that heat relaxing was at a temperature of 116°C. A fiber of fibril-matrix nature free of devitrification and fibrillation was obtained which had a Young's modulus of 1.34 grams/denier at 95°C.

EXAMPLE 4

The procedure of Example 1 was again followed except that the spinnerette employed had 25 orifices each of 0.2 millimeter diameter. The fiber obtained was of about 50 deniers and exhibited the fibril-matrix structure as in Example 1. The fiber exhibited remarkably improved dimensional stability to hot-wet conditions compared to a similar fiber not containing the polycarbonate additive.

We claim:

1. An acrylic fiber of improved hot-wet properties and improved elastic recovery which comprises a matrix of a fiber-forming acrylonitrile polymer containing at least 40 weight percent of acrylonitrile and any balance of one or more monomers copolymerizable therewith, said matrix forming from 50 to 99 weight percent of the total weight of fiber and discontinuously distributed within said matrix from about 1 to 50 weight percent based on the total weight of fiber of a polycarbonate of the formula

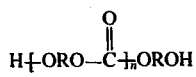

wherein R is the residue of an aliphatic or aromatic-alipathic dihydroxy organic compound after esterification to form a polycarbonate and n is an integer sufficient to provide a molecular weight of at least about 18,000, said polycarbonate being present in the form of a plurality of fibrils of a diameter in the range of about 0.05 to 5 microns and a length to diameter ratio of at least 10.

2. The fiber of claim 1 wherein the fiber-forming polymer contains at least 80 weight percent of acrylonitrile.

3. The fiber of claim 2 wherein the polycarbonate is based on bisphenol A.

4. The fiber of claim 3 wherein the polycarbonate has a molecular weight of 120,000.

5. A process for preparing an acrylic fiber of improved hot-wet properties and improved elastic recovery which comprises: (a) preparing a spinning solution of a fiber-forming polymer containing at least 40 weight percent of acrylonitrile and any balance of one or more monomers copolymeriziable therewith, said solution containing from about 5 to 35 weight percent of said fiber-forming polymer; (b) separately preparing a solution of a polycarbonate of the general formula

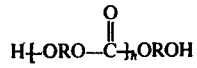

wherein R is the residue of an aliphatic or aromatic-aliphatic dihydroxy organic compound reacted to form a polycarbonate ester and n is an integer sufficient to provide a molecular weight of at least about 18,000 in a solvent therefor, said polycarbonate solution being incompatible with said spinning solution and containing from about 2 to 35 weight percent of polymer; (c) intimately dispersing said polycarbonate solution in said spinning solution so as to provide from about 1 to 50 weight percent of polycarbonate based on the total weight of fiber-forming polymer and polycarbonate; (d) spinning said dispersion into filaments; (e) washing the spun filaments; (f) stretching the washed filaments; (g) drying the stretched filaments; and (h) thereafter heat relaxing the dried fiber.

6. The process of claim 5 wherein the fiber-forming polymer contains at least 80 weight percent acrylonitrile.

7. The process of claim 6 wherein the spinning procedure is wet-spinning.

8. The process of claim 6 wherein the solvent used in preparing the spinning solution is an aqueous thiocyanate solution.

9. The process of claim 8 wherein the spinning solution is spun into an aqueous thiocyanate coagulant.